US009333633B2

(12) United States Patent
Bayham

(10) Patent No.: US 9,333,633 B2
(45) Date of Patent: May 10, 2016

(54) DUAL MUZZLE NAIL GUN

(71) Applicant: Steven S. Bayham, Toms River, NJ (US)

(72) Inventor: Steven S. Bayham, Toms River, NJ (US)

(*) Notice: Subject to any disclaimer, the term of this patent is extended or adjusted under 35 U.S.C. 154(b) by 420 days.

(21) Appl. No.: 13/986,895

(22) Filed: Jun. 17, 2013

(65) Prior Publication Data

US 2014/0367443 A1 Dec. 18, 2014

(51) Int. Cl.
*B25C 1/04* (2006.01)
*B25C 1/18* (2006.01)
*B23B 39/16* (2006.01)

(52) U.S. Cl.
CPC ................. *B25C 1/184* (2013.01); *B25C 1/047* (2013.01)

(58) Field of Classification Search
CPC .......... B25C 1/04; B25C 1/184; B25C 1/047; B25C 1/041; B25C 1/042; B25C 1/043; B25C 5/13; B25D 2250/291; B23B 39/16; B23B 39/161; B23B 39/168
USPC .......................................... 227/119, 130, 67
See application file for complete search history.

(56) References Cited

U.S. PATENT DOCUMENTS

2013/0134205 A1* 5/2013 Cooper .................... G09F 3/14 227/68

* cited by examiner

*Primary Examiner* — Andrew M Tecco
*Assistant Examiner* — Praachi M Pathak
(74) *Attorney, Agent, or Firm* — Clifford G. Frayne

(57) ABSTRACT

A nail gun, for particular use with respect to the installation of roofing shingles, the nail gun having a dual feed and a dual muzzle for permitting the nail gun to drive two nails simultaneously.

8 Claims, 3 Drawing Sheets

DUAL MUZZLE NAIL GUN

BACKGROUND OF THE INVENTION

1. Field of the Invention

The present invention relates to nail guns, and in particular, what is known in the trade as a coil nail gun, and more particularly, to a coil nail gun which has a dual muzzle capable of driving two nails simultaneously, such a dual drive of particular importance and advantage when installing roofing shingles.

2. Description of the Prior Art

Nail guns, industrial staples, and tackers, are all used in the construction industry to secure interior and exterior construction materials. These devices are pneumatic in nature being operated from a source of compressed air. The general working principles of these pneumatic devices are similar, but their structures differ from nail gun to nail gun and stapler to stapler.

A coil nail gun normally would include a body in which a piston and cylinder are installed, a handle is formed to the body portion and grasped by the hand of the user, and having a supply passage for the communication of compressed air to the piston. The coil nail gun would include a magazine installed adjacent the body portion in which the nails, staples, or pins are loaded.

A feed mechanism automatically moves the securing devices (nails, staples, pins) into alignment and registration with a muzzle which is positioned on the front side of the body member and which through trigger activation the pneumatic action of the nail gun inserts the nail into the construction material.

Applicant's coil nail gun differs from the prior art in that it has two feed mechanisms and two muzzles for delivery of two nails to the construction piece. This dual action is particularly advantageous with respect to the installation of roofing singles.

Shingle blow off is very common when a roof is hit with high winds. Most shingles are nailed down with eight nails, four when attaching the shingle, and four more when the next row of shingles goes on above the initial shingle. This is the most common nail pattern with most laminated shingles. Eight nails will usually hold down shingles in winds up to 70 miles per hour. Shingle adherence can be increased by adding two extra nails per shingle. This would increase the adherence to approximately 120 miles per hour. Although a misnomer, it is commonly called hurricane nailing, and is code in many states frequented by hurricanes. This type of nailing is explained with respect to FIG. 1 hereafter.

The International Building Code stipulates wind loads for areas based on weather patterns and weather history. In no area of the United States is the International Building Code wind rating lower than 90 miles per hour. This would mandate the six nail pattern for the installation of shingles, however, it is up to the local building code enforcement offices to enforce this requirement.

Compliance would require six nails, three groups of two nails each. In order to comply with this code, a roofer utilizing a non-pneumatic hammer, would have to hammer in six separate nails. A roofer using a conventional pneumatic nail gun would still have to activate the nail gun six times in order to install the shingle. Applicant's dual muzzle nail gun allows the roofer to install two nails simultaneously, thereby allowing the roofer to activate the nail gun only three times in order to secure a shingle in accordance with building codes.

OBJECTS OF THE INVENTION

An object of the present invention is to provide for a novel nail gun which has a dual feed mechanism and a dual muzzle such that activation of the nail gun results in the installation of two nails simultaneously.

A further object of the present invention is to provide for a novel nail gun having two feed mechanisms and two muzzles which allows for the simultaneous installation of two nails, the nail gun of the present invention having particular advantage with respect to the installation of roofing shingles.

A still further object of the present invention is to provide for a novel nail gun which simultaneously fires and installs two nails with a single trigger application.

SUMMARY OF THE INVENTION

A nail gun, for particular use with respect to the installation of roofing shingles, the nail gun having a dual feed and a dual muzzle for permitting the nail gun to drive two nails simultaneously.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
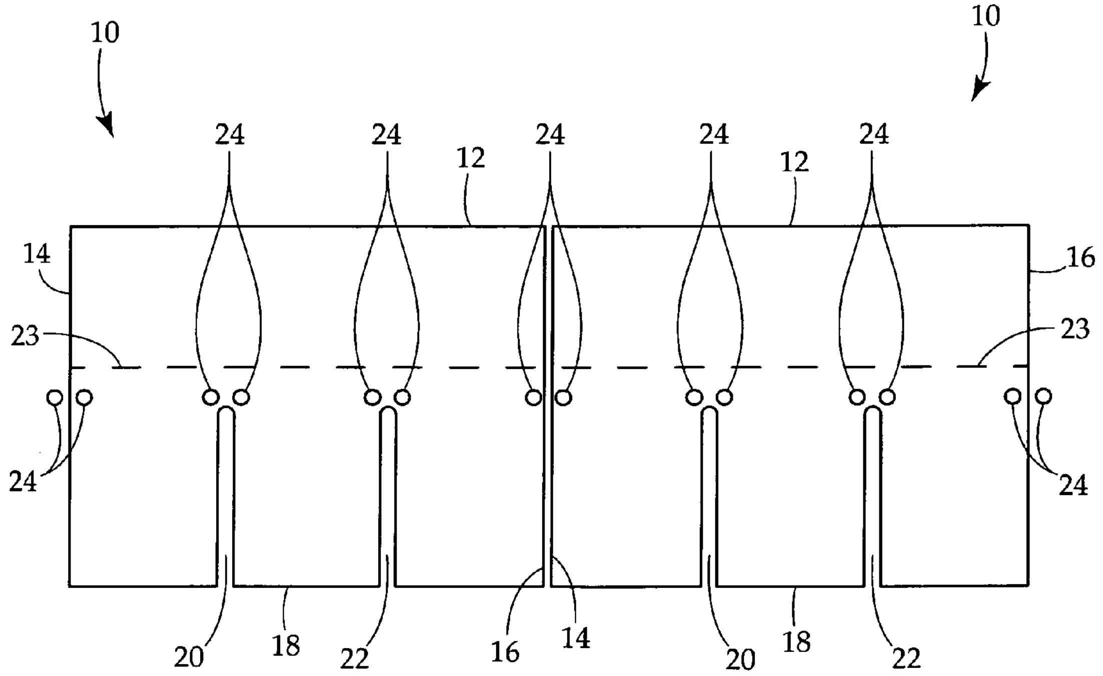
FIG. 1 is a top planar view of a typical shingle installation illustrating the positioning of the securing nails as provided by building code.

FIG. 1 is a planar view of a partial row of roofing shingles illustrating the manner in which their installation is required by many current building codes. Roofing shingle 10 is generally planar and rectangular, having a continuous upper edge 12, side edges 14 and 16, and a lower edge 18 which is segmented into three tab portions by two cut outs 20 and 22 generally parallel to side edges 14 and 16.

Current international building codes require the roofing shingle 10 to be secured to the underlying substrate by means of six fasteners or nails 24, positioned as illustrated to withstand winds of 90 miles per hour. The fasteners or nails 24 should be installed in sets of two at the locations indicated. Each shingle would initially have six nails securing it. Subsequent rows of shingles would overlap and be offset with respect to the underlying row of shingles so as to cover the abutting side edges of the lower row of shingles and the six nails securing these higher shingles would also further secure the immediately lower shingle by penetrating the area above the seal down strip 23. Subsequent rows of shingles would be similarly installed using the fastener pattern illustrated.

Since the code requires a pattern of two nails per set, the installation of shingles would be much easier and more quickly accomplished if the nail gun which would normally be utilized for the installation of the fasteners were capable of having a dual muzzle such that it could drive two nails simultaneously, and thus accomplish the required pattern and installation in half of the time.

Figure 2:
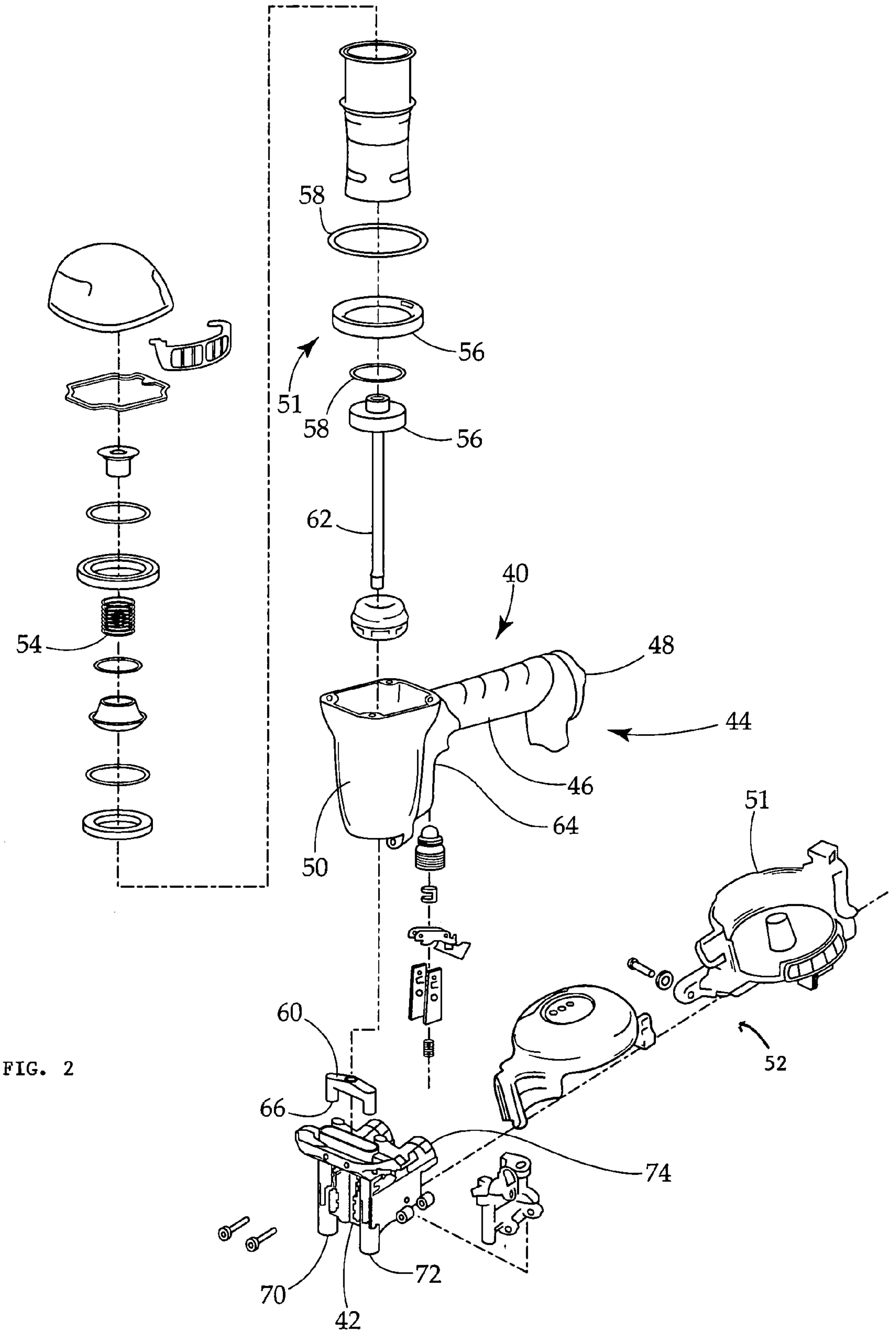
FIG. 2 is an exploded perspective view of a nail gun of the present invention.

FIG. 2 is an exploded perspective view of a modified pneumatic nail gun 40 which incorporates a dual muzzle 42 for the installation of two nails 24 simultaneously.

Figure 3:
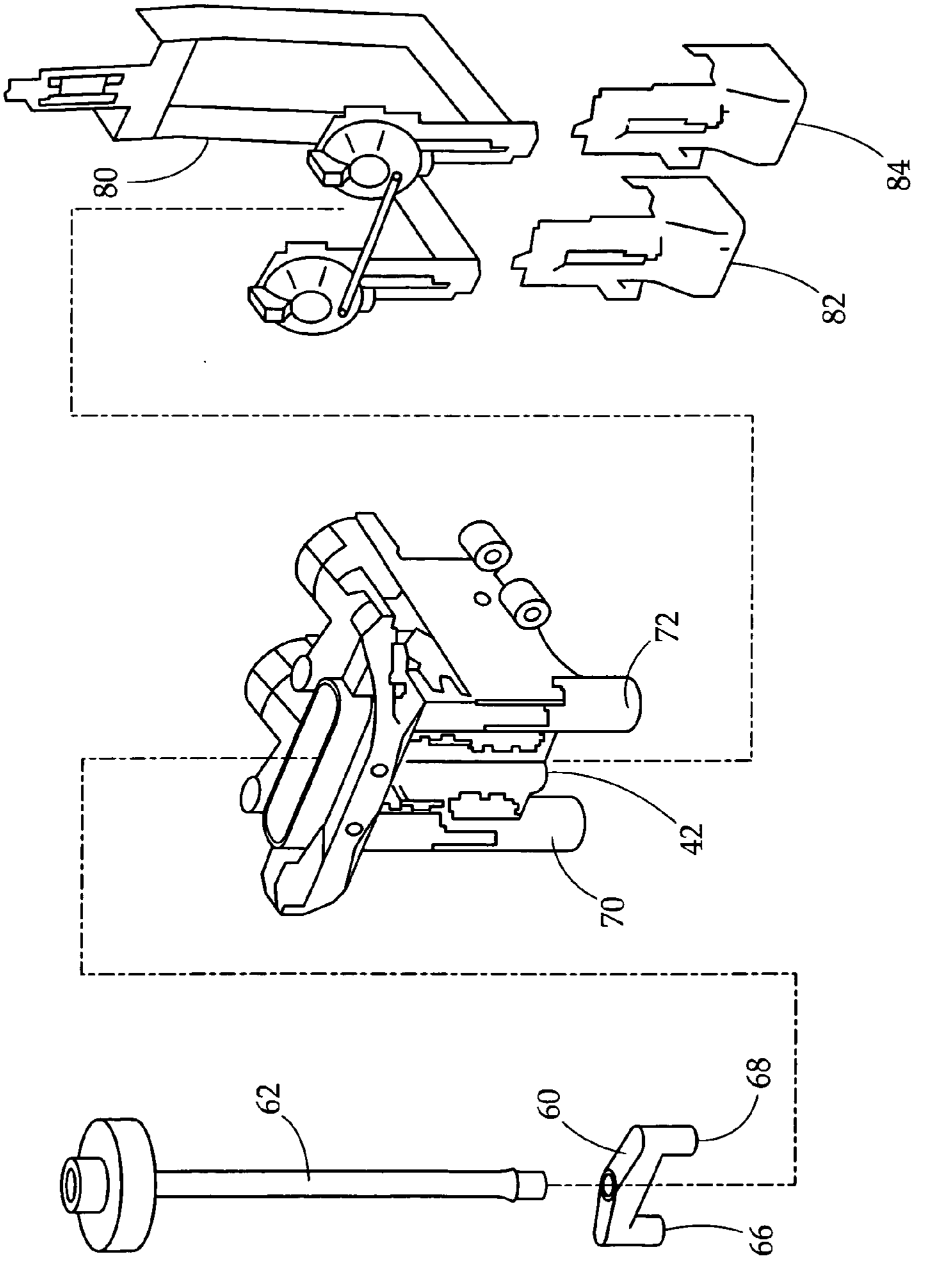
FIG. 3 is an exploded perspective close-up view of the dual muzzle of the nail gun of the present invention.

FIG. 3 is a close up exploded perspective view of a dual muzzle nail gun of the present invention. The nail gun 40 comprises a housing 44 which incorporates a handle portion 46, a connector portion 48 which would be secured to a source of compressed gas for pneumatic operation of nail gun 40, a drive housing 50 which would house the driving assembly 51, and finally, a canister assembly 52 secured to the housing which would be refillable with the appropriate fastener, i.e. nails, for the task being performed.

The drive assembly 51 which is vertically oriented and positioned above the dual muzzle 42, is comprised of a series of biasing means 54, valves 56, seals 58, and a piston driver assembly 60 and guide 62, which are all activated by means of a trigger mechanism 64 proximate the handle portion 46 of nail gun 40. Activation of the trigger mechanism 64 activates the pneumatic action of the piston driver 60 via the pneumatic pressurized gas, which in this particular type of nail gun, has two contact heads 66 and 68 for engaging two nails simultaneously, one in each of the muzzles 70 and 72 of the dual muzzle head 42. The nails 24, so positioned, are fed from the nail canister 52 to each of the muzzles 70 and 72 and placed in registration therein by means of a transport mechanism and guide trip 74. The muzzle 70 and 72 are nested in a trigger safety 80 which also includes a pair of contact feet 82 and 84, which further complement the safety features.

A single activation of the trigger mechanism, activates the drive mechanism such that the piston driver moves downwardly within the muzzle head engaging the head of each nail simultaneously in each of the muzzles, and drives the nail through the single and into the underlying substrate. The driver piston is automatically withdrawn vertically upwardly after having driven the nails and is positioned into the dual muzzle head assembly awaiting the activation of the trigger mechanism to repeat the task. During the driver piston's upward movement, nails are automatically transported to and registered in the dual muzzle head for the subsequent activation of the trigger mechanism and the driver piston.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A pneumatic nail gun comprising:

a body having a piston and cylinder, including a pneumatic air supply for supplying air to said piston, a handle grasped by hand, and a nail canister assembly installed for housing a supply of nails, staples or pins, which are loaded therein;

a transport mechanism and trip guide for receiving said nails, staples or said pins loaded from said nail canister assembly, and for keeping said nails, staples, or said pins in alignment for feeding into a muzzle end positioned at a forward end of said body;

a dual muzzle, having a first muzzle and a second muzzle positioned side by side in said muzzle end of said body, each muzzle belay fed said nail, staple or pin, said nail, staple or said pin being ejected from said muzzles by said piston into a substrate, said dual muzzles are in spaced apart parallel relationship so as to facilitate the simultaneous ejection and driving of a pair of roofing nails through shingles and into an underlying substrate in respect to the applicable distance required between said roofing nails.

2. The pneumatic nail gun in accordance with claim 1 wherein said piston is formed with a dual head, said piston engaging said nails, staples or said pins loaded in said first and second muzzles, thereby ejecting a pair of said nails, staples or said pins into said underlying substrate.

3. The pneumatic nail gun in accordance with claim 1 wherein a single nail canister assembly supplies said nails, staples or said pins to said dual muzzle.

4. The pneumatic nail gun in accordance with claim 1 wherein said nail canister assembly comprises two separate nail canister assemblies, each nail canister assembly dedicated to a separate muzzle.

5. A pneumatic nail gun for driving two roofing nails through shingles and into an underlying substrate at a predetermined, spaced apart distance, the pneumatic nail gun comprising:

a body having a piston and cylinder, including a pneumatic air supply for supplying air to said piston, a handle grasped by hand, and a nail canister assembly installed for housing a supply of roofing nails, which are loaded therein;

a transport mechanism and trip guide for receiving said roofing nails from said nail canister assembly and for keeping said roofing nails in alignment for feeding into a muzzle end positioned at the forward end of said body;

a dual muzzle having a first muzzle and a second muzzle positioned side by side in spaced apart relationship in said muzzle end of said body, each muzzle being fed said roofing nails, said roofing nails being ejected from said first and second muzzles by said piston through said roofing shingle and into said underlying substrate, said dual muzzles are in spaced apart parallel relationship so as to facilitate the simultaneous ejection and driving of a pair of roofing nails through shingles and into an underlying substrate in respect to the applicable distance required between said roofing nails.

6. The pneumatic nail gun in accordance with claim 5 wherein said piston is formed with a dual head, said piston engaging said roofing nails loaded in said first and second muzzles, thereby ejecting a pair of said roofing nails into said underlying substrate.

7. The pneumatic nail gun in accordance with claim 5 wherein a single nail canister assembly supplies said roofing nails to said dual muzzle.

8. The pneumatic nail gun in accordance with claim 5 wherein said nail canister assembly comprises two separate nail canister assemblies, each nail canister assembly dedicated to a separate muzzle.

* * * * *